(12) United States Patent
Hata et al.

(10) Patent No.: US 7,776,305 B2
(45) Date of Patent: Aug. 17, 2010

(54) METHOD FOR PURIFICATION OF NITROGEN OXIDE AND APPARATUS FOR PURIFICATION OF NITROGEN OXIDE

(75) Inventors: Hiroyuki Hata, Hyogo (JP); Kenji Hamada, Hyogo (JP); Shinichi Tai, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 103 days.

(21) Appl. No.: 11/990,668

(22) PCT Filed: Aug. 17, 2006

(86) PCT No.: PCT/JP2006/316153

§ 371 (c)(1),
(2), (4) Date: Feb. 19, 2008

(87) PCT Pub. No.: WO2007/020968

PCT Pub. Date: Feb. 22, 2007

(65) Prior Publication Data

US 2009/0238749 A1    Sep. 24, 2009

(30) Foreign Application Priority Data

Aug. 19, 2005    (JP)    ............................. 2005-238510

(51) Int. Cl.
*C01B 21/20*    (2006.01)
(52) U.S. Cl. .................. 423/400; 423/385; 423/388
(58) Field of Classification Search .................. 423/388, 423/400, 385
See application file for complete search history.

(56) References Cited

U.S. PATENT DOCUMENTS

| | | | |
|---|---|---|---|
| 2,568,396 A * | 9/1951 | James | .................. 423/400 |
| 3,063,804 A | 11/1962 | Morrow | |
| 3,070,425 A * | 12/1962 | Grossmann | .................. 423/400 |
| 4,177,645 A | 12/1979 | Schwarz | |
| 5,670,127 A | 9/1997 | Sheu | |
| 6,370,911 B1 | 4/2002 | Zhou et al. | |
| 6,514,642 B2 * | 2/2003 | Okazaki et al. | ................. 430/5 |

FOREIGN PATENT DOCUMENTS

| | | |
|---|---|---|
| EP | 0 636 576 | 2/1995 |
| GB | 855 191 | 11/1960 |
| JP | 54-20994 | 2/1979 |
| JP | 2572646 | 10/1996 |
| JP | 9-175804 | 7/1997 |
| JP | 2001-114504 | 4/2001 |
| JP | 2004-10391 | 1/2004 |

OTHER PUBLICATIONS

International Search Report from the corresponding PCT/JP2006/316153, mailed Dec. 5, 2006.

* cited by examiner

*Primary Examiner*—Timothy C Vanoy
*Assistant Examiner*—Michelle Hou
(74) *Attorney, Agent, or Firm*—Hamre, Schumann, Mueller & Larson, P.C.

(57) ABSTRACT

A nitrogen oxide purifying apparatus includes a gas absorption vessel (1) and a condenser (6), where the vessel receives an absorption solution containing liquefied $N_2O_4$ for absorbing NO and also receives a source gas to vary the temperature and/or pressure of the source gas and the absorption solution, while the condenser receives a gas from the gas absorption vessel (1) to vary the temperature and/or pressure of the gas. In the gas absorption vessel (1), the absorption solution containing liquefied $N_2O_4$ may be applied to the source gas containing NO, so that NO is absorbed in the absorption solution. Then the absorption-solution is heated and/or depressurized to generate an intermediate gas containing a relatively large amount of NO and a smaller amount of $NO_2$ from the absorption solution. In the condenser (6), the intermediate gas is cooled and/or pressurized to give condensed $N_2O_3$ and/or condensed $N_2O_4$.

4 Claims, 3 Drawing Sheets

METHOD FOR PURIFICATION OF NITROGEN OXIDE AND APPARATUS FOR PURIFICATION OF NITROGEN OXIDE

TECHNICAL FIELD

The present invention relates to a method and apparatus for purifying a nitrogen oxide, such as nitrogen monoxide, nitrogen dioxide, or nitrous oxide.

BACKGROUND ART

The nitrogen element can have an atomic value varying from monovalent to pentavalent, and there are many types of nitrogen oxides (usually in a gas state under a normal temperature and normal pressure), such as nitrous oxide ($N_2O$), nitrogen monoxide (NO) and nitrogen dioxide ($NO_2$). Also, a nitrogen oxide can be easily reacted with another nitrogen oxide, thereby giving a new nitrogen oxide. Accordingly, a system containing the nitrogen oxide tends to be complicated, in terms of the type and amount of the nitrogen oxides involved. For example, upon manufacturing NO through an ammonia oxidation method, which is a popular industrial manufacturing method thereof, $N_2O$, $NO_2$, and $N_2$ are generated as by-products in addition to the desired NO, and mixed in the NO gas as impurities.

To increase the purity of a nitrogen oxide, or to refine the same, distillation may be performed. When executing the distillation of the nitrogen oxide, however, the step often has to be performed under an ultra-low temperature, mainly because the boiling points of $N_2O$ and NO are significantly low (boiling point of $N_2O$ is $-89°$ C., and NO $-152°$ C.). The nitrogen oxide is what is known as an endothermic compound, and executing the ultra-low temperature step is problematic from the viewpoint of safety, because it is known that the condensed nitrogen oxide may even explode from an impact, depending on the condition. Especially, the impact sensitivity of liquefied NO with respect to explosion probability is close to that of nitroglycerin, and therefore purification of NO by distillation presents a serious problem in the aspect of safety.

Meanwhile, another known method of purifying a nitrogen oxide is supplying a raw gas (source gas) for the nitrogen oxide under a predetermined condition so as to flow through a column loaded with an adsorbent such as zeolite. By this method, a predetermined component in the source gas is adsorbed by the adsorbent, to be thereby separated from unabsorbed components. The separation technique of $N_2O$ and NO utilizing the zeolite adsorbent can be found, for example, in the patent document 1 cited below. When purifying a target nitrogen oxide with the separation technique employing the zeolite adsorbent, however, the larger number of nitrogen oxide species the source gas contains, the more types of zeolite adsorbents have to be employed, and in many cases the number of columns also has to be increased, which makes the purification system complicated. Such technique often fails to efficiently purify a nitrogen oxide (often contained in a multicomponent system before the purification).

Patent document 1: JP-A-2004-10391

DISCLOSURE OF THE INVENTION

An object of the present invention is to provide a method of purifying a nitrogen oxide appropriate for efficiently purifying the nitrogen oxide with high safety.

Another object of the present invention is to provide an apparatus that purifies a nitrogen oxide, appropriate for efficiently purifying the nitrogen oxide with high safety.

A first aspect of the present invention provides a method of purifying a nitrogen oxide. The method comprises a condensation-separation step for cooling and/or pressurizing a source gas containing nitrogen monoxide (NO) and nitrogen dioxide ($NO_2$), thereby giving condensed dinitrogen trioxide (condensed $N_2O_3$) and/or condensed dinitrogen tetraoxide (condensed $N_2O_4$). The condensed $N_2O_3$ means liquefied or solidified $N_2O_3$, and the condensed $N_2O_4$ means liquefied or solidified $N_2O_4$. The condensed $N_2O_3$ and the condensed $N_2O_4$ do not explode from an impact.

In a gas state, NO and $NO_2$ are equilibrated with $N_2O_3$ as indicated by the following chemical formula (1), and $NO_2$ is equilibrated with $N_2O_4$ as indicated by the following chemical formula (2). Such equilibrated state is quickly achieved. The reaction of NO and $NO_2$ that gives $N_2O_3$ is an exothermic reaction, and also reduces the molecular number, and hence the equilibrium of the chemical formula (1) is shifted to the right side by cooling and pressurizing. The reaction that gives $N_2O_4$ from $NO_2$ is also an exothermic reaction, which also reduces the molecular number, and hence the equilibrium of the chemical formula (2) is also shifted to the right side by cooling and pressurizing.

  (1)

  (2)

Here, the melting point and the boiling point of various types of nitrogen oxides are indicated in Table 1. A majority of $N_2O_3$ is decomposed to turn into NO and $NO_2$ at a temperature higher than the boiling point. $NO_2$ and $N_2O_4$ are equilibrated in a wide temperature range under normal pressure, and the abundance ratio of $NO_2$ in this equilibrium system is approximately 0.01% at the melting point of $N_2O_4$ ($-9°$ C.), approximately 0.1% at the boiling point of $N_2O_4$ ($21°$ C.), approximately, 90% at $100°$ C., and generally 100% at a temperature higher than $140°$ C.

TABLE 1

| | Formula | Melting Point (° C.) | Boiling Point (° C.) |
|---|---|---|---|
| Nitrogen Monoxide | NO | −164 | −152 |
| Nitrous Oxide | $N_2O$ | −91 | −89 |
| Dinitrogen Trioxide | $N_2O_3$ | −102 | 4 |
| Dinitrogen Tetraoxide | $N_2O_4$ | −9 | 21 |

In the nitrogen oxide purification method according to the first aspect, the source gas contains in a gas state NO, $NO_2$, and $N_2O_3$ and $N_2O_4$ which are equilibrated with the NO and the $NO_2$, before being subjected to the condensation-separation step. And in the condensation-separation step, the source gas is cooled and/or pressurized so as to achieve a condition that allows concentrating the $N_2O_3$ and the $N_2O_4$ in the source gas, and thereby separating the $N_2O_3$ and the $N_2O_4$ from the gas phase. When the $N_2O_3$ and the $N_2O_4$ are condensed and removed from the gas phase, $N_2O_3$ and $N_2O_4$ are quickly generated from the NO and the $NO_2$, if available, to thereby restore the equilibrium according to the chemical formulae (1) and (2), and the $N_2O_3$ and the $N_2O_4$ thus generated are immediately condensed to be removed from the gas phase.

Accordingly, in the case where a larger amount of NO is present in the source gas than $NO_2$, the purity of the NO in the source gas can be highly increased by continuing the foregoing, condensation-separation step until the $NO_2$ in the source gas is sufficiently removed. Likewise, in the case where a larger amount of $NO_2$ is present in the source gas than NO, the purity of the $NO_2$ in the source gas can be highly increased by continuing the foregoing condensation-separation step until the NO in the source gas is sufficiently removed. By such method according to the first aspect, NO or $NO_2$ can be efficiently purified through a single step (condensation-separation step), from a nitrogen oxide multicomponent source gas containing NO and $NO_2$, hence $N_2O_3$ and $N_2O_4$. Besides, the method according to the first aspect eliminates the need to condense or liquefy NO when increasing the purity of NO or $NO_2$ (in other words, the need to execute the ultra-low temperature step below −152° C., which is the boiling point of NO), thereby enabling purifying NO or $NO_2$ with high safety.

Meanwhile, in the case where the source gas contains $N_2O$ in the first aspect, the purity of the $N_2O$ in the source gas can be highly increased by continuing the foregoing condensation-separation step until the NO and/or the $NO_2$ in the source gas is sufficiently removed. In the case where the source gas contains $N_2O$, it is preferable to execute a concentration adjustment step for adjusting the concentration of NO and $NO_2$ in the source gas, before the condensation-separation step. Appropriately adjusting the concentration of NO and $NO_2$ in the source gas through the concentration adjustment step enables sufficiently removing both NO and $NO_2$ through the condensation-separation step. Preferably, the ratio of NO concentration and $NO_2$ concentration achieved through the concentration adjustment step is $NO_2/NO \geq 1$ in molar ratio. Thus, the method according to the first aspect allows efficiently purifying $N_2O$ from a multicomponent source gas of nitrogen oxides through a single step (condensation-separation step), in the case where the source gas contains NO and $NO_2$, hence $N_2O_3$ and $N_2O_4$, and further $N_2O$. Besides, the method according to the first aspect eliminates the need to condense or liquefy $N_2O$ itself when increasing the purity of $N_2O$ (in other words, the need to execute the ultra-low temperature step below −89° C., which is the boiling point of $N_2O$), thereby enabling purifying $N_2O$ with high safety.

As described above, the method of purifying a nitrogen oxide according to the first aspect of the present invention is appropriate for efficiently purifying a nitrogen oxide (NO, $NO_2$, or $N_2O$) with high safety.

A second aspect of the present invention provides another method of purifying a nitrogen-oxide, which is different from the first aspect. The method includes an absorption step, a revaporization step, and a condensation-separation step. The absorption step includes applying an absorption solution containing liquefied $N_2O_4$ to a source gas containing NO, thereby causing the absorption solution to absorb NO (first absorption step). The revaporization step includes heating and/or depressurizing the absorption solution after the absorption step, so as to generate an intermediate gas containing a relatively larger amount of NO and a relatively smaller amount of $NO_2$ from the absorption solution. The condensation-separation step includes cooling and/or pressurizing the intermediate gas, thereby giving condensed $N_2O_3$ and/or condensed $N_2O_4$.

NO causes a reversible reaction with liquefied $N_2O_4$ according to the following chemical formula (3) thereby giving $N_2O_3$, and $N_2O_3$ thus generated is absorbed in the liquefied $N_2O_4$ at a predetermined temperature or lower. The absorption step according to the second aspect utilizes such characteristic to cause the absorption solution containing liquefied $N_2O_4$ to substantially absorb NO, by applying such absorption solution to the source gas containing NO. In the case where the source gas contains $NO_2$, $NO_2$ is absorbed as liquefied $N_2O_4$ in the absorption solution containing liquefied $N_2O_4$, in the absorption step. In the case where the source gas contains, for example, $N_2$ or $CO_2$, the $N_2$ or $CO_2$ is separated from NO instead of being substantially absorbed in the absorption solution containing the liquefied $N_2O_4$.

$$NO + \tfrac{1}{2}N_2O_4 \leftrightarrows N_2O_3 + \text{Heat} \quad (3)$$

In the revaporization step, the absorption solution containing $N_2O_3$ is heated and/or depressurized, to thereby promote the evaporation of the $N_2O_3$ in the absorption solution. A majority of the $N_2O_3$ thus evaporated is immediately decomposed into NO and $NO_2$, so that an intermediate gas in which NO, $NO_2$, $N_2O_3$, and $N_2O_4$ are equilibrated is generated from the NO and $NO_2$ thus produced, according to the foregoing chemical formulae (1) and (2). Also, the intermediate gas has achieved the equilibrium among NO, $NO_2$, $N_2O_3$, and $N_2O_4$ from an equivalent amount of NO and $NO_2$ according to the chemical formulae (1) and (2), and hence contains a larger amount of NO than $NO_2$.

In the condensation-separation step, the intermediate gas is cooled and/or pressurized so as to achieve a condition that allows $N_2O_3$ and $N_2O_4$ in the intermediate gas to be condensed, and thereby removed from the gas phase. Once the $N_2O_3$ and the $N_2O_4$ are condensed and removed from the gas phase, $N_2O_3$ and $N_2O_4$ are quickly generated from the remaining NO and $NO_2$ in the gas phase, so as to restore the equilibrium according to the chemical formulae (1) and (2), and the $N_2O_3$ and the $N_2O_4$ thus produced are immediately condensed, to be removed from the gas phase. Accordingly, the purity of NO in the intermediate gas can be highly increased by continuing the condensation-separation step until $NO_2$ in the intermediate gas is sufficiently removed.

As described above, the method according to the second aspect allows eventually separating NO in the condensation-separation step despite that the source gas is a multicomponent gas containing NO, $NO_2$, $N_2$, $CO_2$ and so forth, thereby efficiently purifying NO from the source gas. Besides, the method according to the second aspect eliminates the need to condense or liquefy NO itself when increasing the purity of NO (in other words, the need to execute the ultra-low temperature step below −152° C., which is the boiling point of NO), thereby enabling purifying $N_2O$ with high safety. Thus, the method of purifying a nitrogen oxide according to the second aspect of the present invention is appropriate for efficiently purifying a nitrogen oxide (NO) with high safety.

In the nitrogen oxide purification method according to the second aspect, it is preferable to execute, in parallel with the first absorption step, another absorption step (second absorption step) including applying an absorption solution containing liquefied $N_2O_4$ to unabsorbed gas remaining unabsorbed in the absorption solution through the first absorption step, and thereby causing the absorption solution to absorb NO in the unabsorbed gas. Executing thus two stages of absorption step is appropriate for improving the net absorption amount or absorptivity of NO into the absorption solution, and hence appropriate for increasing the yield of NO.

Meanwhile, in the nitrogen oxide purification method according to the second aspect, the source gas may contain $N_2O$. In this case, whereas the majority of $N_2O$ is separated from NO instead of being absorbed in the absorption solution containing liquefied $N_2O_4$ in the first absorption step, a part of the $N_2O$ in the source gas may be dissolved and absorbed in the absorption solution, depending on the temperature condition or pressure condition. In this case, in the revaporization step, the intermediate gas derived from the absorption solution also contains $N_2O$ in addition to NO and $NO_2$, as long as $N_2O$ is present in the absorption solution. Accordingly, especially in the case where the source gas contains $N_2O$, it is preferable to execute, in parallel with the revaporization step, another absorption step (third absorption step) including applying an absorption solution containing liquefied $N_2O_4$ to the intermediate gas generated in the revaporization step, and thereby causing the absorption solution to absorb NO and $NO_2$ in the intermediate gas. Executing the third absorption step in parallel with the revaporization step enables efficiently separating $N_2O$ in the intermediate gas from NO, utilizing the difference in substantial absorptivity between NO and $N_2O$ with respect to the absorption solution (significantly large). Also, in the case of adopting such third absorption step, the third absorption step is terminated halfway of the revaporization step, so that the intermediate gas containing NO and $NO_2$ is generated from the absorption solution through the revaporization step unaccompanied with the third absorption step, under a state where $N_2O$ is sufficiently removed and NO is condensed in the absorption solution.

In the nitrogen oxide purification method according to the second aspect, in the case where the unabsorbed gas, remaining unabsorbed in the absorption solution through at least one of the foregoing absorption step, contains at least $N_2O$ and impurity NO, a composition adjustment step including adding $NO_2$ to the unabsorbed gas and a condensation-separation step including cooling and/or pressurizing the unabsorbed gas which has undergone the composition adjustment step, so as to give condensed $N_2O_3$ and/or condensed $N_2O_4$ may further be executed. Such step allows purifying $N_2O$ by the method according to the second-aspect, in addition to purifying NO. The specific step of purifying $N_2O$ may be the same as that taken when the source gas contains $N_2O$ in the method according to the first aspect.

A third aspect of the present invention provides an apparatus that purifies a nitrogen oxide. The apparatus comprises a gas absorption vessel and a condenser. The gas absorption vessel is capable of receiving an absorption solution containing liquefied $N_2O_4$ so as to absorb NO, receiving a source gas, and varying a temperature and/or pressure of the source gas and the absorption solution. The condenser is capable of receiving the gas from the absorption vessel and varying a temperature and/or pressure of the gas. The apparatus thus constructed is appropriate for executing the nitrogen oxide purification method according to the second aspect.

Preferably, the apparatus according to the third aspect further comprises an intermediate absorption unit disposed in a gas flow path provided from the gas absorption vessel to the condenser, so as to enable a gas-liquid contact, and the gas flow path allows the absorption solution to circulate therethrough between the gas absorption vessel and the intermediate absorption unit, in a direction opposite to the gas flow. For example, a column loaded with a filler or an absorption tower such as a bubble tower may be suitably employed as the intermediate absorption unit. Such structure is appropriate for executing the nitrogen oxide purification method according to the second aspect.

Other objects, features and advantages of the present invention will become more apparent from the following embodiments described referring to the accompanying drawings.

BEST MODE FOR CARRYING OUT THE INVENTION

Figure 1:
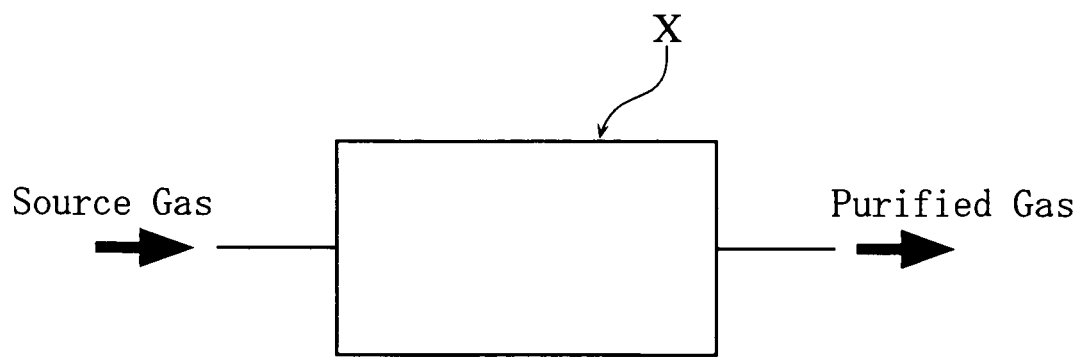
FIG. 1 is a schematic diagram showing a condenser employed for executing the nitrogen oxide purification method according to the present invention.

FIG. 1 is a schematic diagram showing a condenser X employed for executing the NO purification method according to the first embodiment of the present invention. The condenser X is used to condense (liquefy or solidify) a predetermined component contained in a source gas introduced thereinto, and is subject to a variable control of the internal temperature and the internal pressure thereof. The variable range of the internal temperature of the condenser X is −160 to 30° C. for example, and the variable range of the internal pressure is 0.01 to 6 MPa, for example.

By the NO purification method according to the first embodiment, the source gas containing NO as predominant component, $NO_2$ of a lower composition ratio than the NO, and $N_2O_3$ and $N_2O_4$ which are equilibrated with the NO and the $NO_2$ is subjected to a predetermined condensation-separation step through the condenser X. To be more detailed, the source gas is introduced into the condenser X to be cooled and/or pressurized to a lower temperature and/or higher pressure than before the introduction, and the internal temperature and/or internal pressure of the condenser X is controlled so as to generate condensed $N_2O_3$ and condensed $N_2O_4$ from the source gas. Then the gas that has undergone such condensation-separation step is collected as purified gas.

Through the condensation-separation step, $N_2O_3$ and $N_2O_4$ are condensed in the condenser X, thus to be removed from the gas phase. However, as long as $NO_2$ is present in the gas phase, $N_2O_3$ and $N_2O_4$ are quickly generated so as to restore the equilibrium according to the foregoing chemical formulae (1) and (2), and the $N_2O_3$ and the $N_2O_4$ thus generated are immediately condensed, thus to be removed from the gas phase. Accordingly, the purity of NO in the source gas can be highly increased by continuing the condensation-separation step until the $NO_2$ in the source gas is sufficiently removed.

Thus, by the method according to the first embodiment, NO can be efficiently purified through a single step (condensation-separation step), from a nitrogen oxide multicomponent source gas containing NO as predominant component, $NO_2$ of a lower composition ratio, $N_2O_3$, and $N_2O_4$. Besides, the method according to the first embodiment eliminates the need to condense or liquefy NO itself when increasing the purity of NO, thereby enabling purifying NO with high safety.

The condenser X may also be employed for executing the $NO_2$ purification method according to the second embodiment of the present invention. By the $NO_2$ purification method according to the second embodiment, the source gas containing $NO_2$ as predominant component, NO of a lower composition ratio than the $NO_2$, and $N_2O_3$ and $N_2O_4$ which are equilibrated with the NO and the $NO_2$ is subjected to a predetermined condensation-separation step through the condenser X. To be more detailed, the source gas is introduced into the condenser X to be cooled and/or pressurized to a lower temperature and/or higher pressure, than before the introduction, and the internal temperature and/or internal pressure of the condenser X is controlled so as to generate condensed $N_2O_3$ and condensed $N_2O_4$ from the source gas. Then the gas that has undergone such condensation-separation step is collected as purified gas.

Through the condensation-separation step, $N_2O_3$ and $N_2O_4$ are condensed in the condenser X, thus to be removed from the gas phase. However, as long as NO is present in the gas phase, $N_2O_3$ is quickly generated so as to restore the equilibrium according to the foregoing chemical formula (1), and the $N_2O_3$ thus generated is immediately condensed, thus to be removed from the gas phase. Accordingly, the purity of $NO_2$ in the source gas can be highly increased by continuing the condensation-separation step until the NO in the source gas is sufficiently removed.

Thus, by the method according to the second embodiment, $NO_2$ can be efficiently purified through a single step (condensation-separation step), from a nitrogen oxide multicomponent source gas containing $NO_2$ as predominant component, NO of a lower composition ratio, $N_2O_3$, and $N_2O_4$. Besides, the method according to the second embodiment eliminates the need to condense or liquefy $NO_2$ itself when separating NO and increasing the purity of $NO_2$, thereby enabling purifying $NO_2$ with high safety.

The condenser X may also be employed for executing the $N_2O$ purification method according to the third embodiment of the present invention. By the $N_2O$ purification method according to the third embodiment, the source gas containing $N_2O$ as predominant component, NO and $NO_2$ of a lower composition ratio than the $N_2O$, and $N_2O_3$ and $N_2O_4$ which are equilibrated with the NO and the $NO_2$ is subjected to a predetermined condensation-separation step through the condenser X. To be more detailed, the source gas is introduced into the condenser X to be cooled and/or pressurized to a lower temperature and/or higher pressure than before the introduction, and the internal temperature and/or internal pressure of the condenser X is controlled so as to generate condensed $N_2O_3$ and condensed $N_2O_4$ from the source gas. Then the gas that has undergone such condensation-separation step is collected as purified gas.

Through the condensation-separation step, $N_2O_3$ and $N_2O_4$ are condensed in the condenser X, thus to be removed from the gas phase. However, as long as NO or $NO_2$ is present in the gas phase, $N_2O_3$ and $N_2O_4$ are quickly generated so as to restore the equilibrium according to the foregoing chemical formulae (1) and (2), and the $N_2O_3$ and the $N_2O_4$ thus generated are immediately condensed, thus to be removed from the gas phase. Accordingly, the purity of $N_2O$ in the source gas can be highly increased by continuing the condensation-separation step until the NO and/or the $NO_2$ in the source gas is sufficiently removed.

In the method according to the third embodiment, it is preferable to execute a concentration adjustment step for adjusting the concentration of NO and $NO_2$ in the source gas, before the condensation-separation step. Appropriately adjusting the concentration of NO and $NO_2$ in the source gas through the concentration adjustment step enables sufficiently-removing both NO and $NO_2$ through the condensation-separation step. Preferably, the ratio of NO concentration and $NO_2$ concentration achieved through the concentration adjustment step is $NO_2/NO \geqq 1$ in molar ratio.

Thus, by the method according to the third embodiment, $N_2O$ can be efficiently purified through a single step (condensation-separation step), from a nitrogen oxide multicomponent source gas containing $NO_2$ as predominant component, NO and $NO_2$ of a lower composition ratio, $N_2O_3$, and $N_2O_4$. Besides, the method according to the third embodiment eliminates the need to condense or liquefy $N_2O$ itself when separating NO and $NO_2$ and increasing the purity of $N_2O$, thereby enabling purifying $N_2O$ with high safety.

Figure 2:
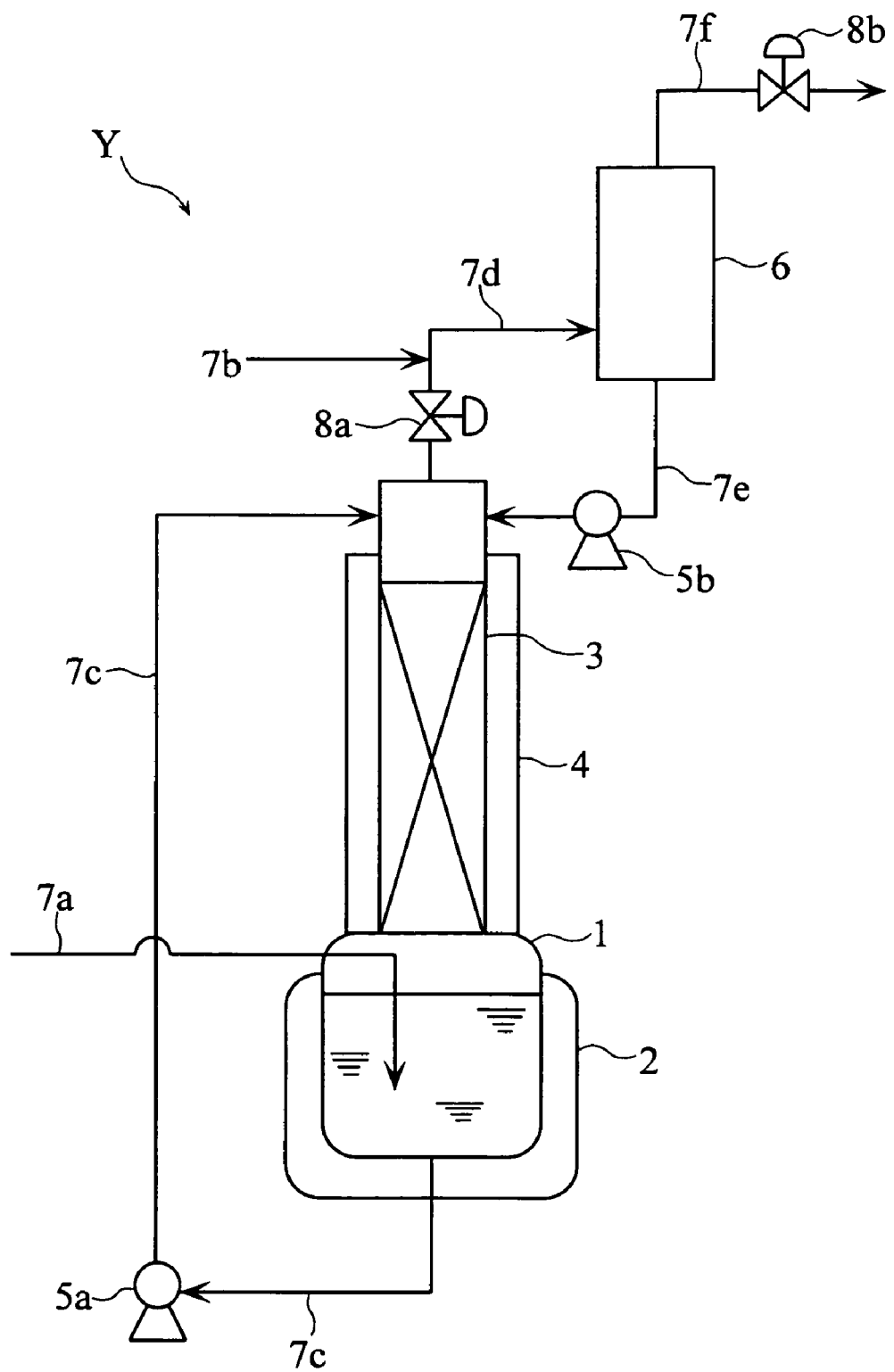
FIG. 2 is a schematic diagram showing a purification apparatus employed for executing the nitrogen oxide purification method according to the present invention.

FIG. 2 is a schematic diagram showing a purification apparatus Y according to a fourth embodiment of the present invention, and this apparatus is applicable to purifying all of the foregoing target nitrogen oxide (NO, $N_2O$, or $NO_2$). The purification apparatus Y shown in FIG. 2 includes a gas absorption vessel 1, a temperature control unit 2, an absorption tower 3, a temperature control unit 4, circulating pumps 5a, 5b, a condenser 6, inlet lines 7a, 7b, a circulation line 7c, transfer lines 7d, 7e, an outlet line 7f, and pressure regulating valves 8a, 8b.

The gas absorption vessel 1 serves to receive the absorption solution, and is subject to a variable control of the internal temperature and the internal pressure thereof. The variable range of the internal temperature of the gas absorption vessel 1 is −80 to 30° C. for example, and the variable range of the internal pressure is 0.01 to 6 MPa, for example. To the gas absorption vessel 1, the absorption solution and the source gas are introduced through the inlet line 7a. The absorption solution to be received by the gas absorption vessel 1 may be pure liquefied $N_2O_4$ or MON (Mixed Oxides of Nitrogen). The MON is a mixture of liquefied $N_2O_3$ and liquefied $N_2O_4$, and applicable as a liquid oxidizing agent for a rocket fuel.

The temperature control unit 2 serves for variable control of the internal temperature of the gas absorption vessel 1, by heating or cooling from outside of the vessel.

The absorption tower 3 serves as the intermediate absorption unit, and is constructed so as to allow a gas phase and a liquid phase to contact each other therein. For example, a column loaded with a filler or a bubble tower may be suitably employed as the absorption tower 3. The variable range of the internal temperature of the absorption tower 3 is −80 to 30° C. for example, and the variable range of the internal pressure is 0.01 to 6 MPa, for example. The temperature control unit 4 serves to execute the variable control of the internal temperature of the absorption tower 3, by heating or cooling from outside of the absorption tower 3.

The circulating pump 5a serves to sequentially transfer the absorption solution from the gas absorption vessel 1 to an upper portion of the absorption tower 3, through the circulation line 7c. Upon activating the circulating pump 5a, the absorption solution flows from the absorption tower 3 to the gas absorption vessel 1, opposite to the gas flow direction, and circulates between the gas absorption vessel 1 and the absorption tower 3.

The condenser 6 serves to condense (liquefy or solidify) a predetermined component contained in the gas provided from the absorption tower 3 through the transfer line 7d, and is subject to a variable control of the internal temperature and the internal pressure thereof. The variable range of the internal temperature of the condenser 6 is −120 to 0° C. for example, and the variable range of the internal pressure is 0.1 to 6 MPa, for example. The gas introduced into the condenser 6 through the transfer line 7d may be subjected to composition adjustment by addition of a desired gas component through the inlet line 7b. Also, the component separated in the condenser 6 may be returned from the condenser 6 to the absorption tower 3 through the transfer line 7e, by activating the circulating pump 5b. The gas that has passed through the condenser 6 without being condensed is discharged out of the apparatus through the outlet line 7f.

The internal pressure of the gas absorption vessel 1, the absorption tower 3, and the condenser 6 in the purification apparatus Y may be set as desired, by appropriately adjusting the pressure regulating valve 8a provided on the transfer line 7d and the pressure regulating valve 8b provided on the outlet line 7f. The internal pressure depends on the composition and temperature of the absorption solution in the gas absorption vessel 1, as well as on the composition and temperature of the condensed solution in the condenser 6. If need be, the internal pressure of the condenser 6 may be set at a pressure different from the internal pressure of the gas absorption vessel 1 and the absorption tower 3.

To purify a nitrogen oxide with the purification apparatus Y, firstly the absorption solution is introduced into the gas absorption vessel 1 through the inlet line 7$a$. The supply quantity of the absorption solution is, for example, 100 to 1000 dm$^3$. Then the source gas is introduced into the gas absorption vessel 1 through the inlet line 7$a$, and the absorption step (first absorption step) is executed. In this embodiment, the source gas may contain NO, NO$_2$ and N$_2$O, which are predominant components, and N$_2$O$_3$ and N$_2$O$_4$ which are equilibrated with the NO and the NO$_2$, as well as N$_2$ and CO$_2$. The supply quantity of the source gas is, for example, 1 to 2000 Ndm$^3$/h per 1 dm$^3$ of absorption solution. Also, the internal temperature in the gas absorption vessel 1 through the absorption step is −40 to 30° C. for example, and the internal pressure is 0.1 to 6 MPa, for example.

As stated earlier, NO is reacted with liquefied N$_2$O$_4$ to thereby give N$_2$O$_3$ according to the reversible reaction as the chemical formula (3), and the N$_2$O$_3$ thus produced is absorbed in the liquefied N$_2$O$_4$ at a predetermined temperature or lower. The absorption step executed in the gas absorption vessel 1 utilizes such characteristic to cause the absorption solution containing liquefied N$_2$O$_4$ to react and absorb NO, by applying such absorption solution to the source gas containing NO. Also, in such absorption step, NO$_2$ in the source gas is absorbed in a form of liquefied N$_2$O$_3$ or liquefied N$_2$O$_4$, in the absorption solution containing liquefied N$_2$O$_4$. With a view to improving the absorption efficiency of NO and NO$_2$ with respect to absorption solution, it is preferable that the absorption solution is at a lower temperature and under a higher pressure. This is advantageous for shifting the equilibrium to the right side in the reversible reaction as the chemical formulae (1) and (2), to thereby promote the generation and concentration of N$_2$O$_3$ and N$_2$O$_4$. Although N$_2$O in the source gas can barely be absorbed in the absorption solution containing liquefied N$_2$O$_4$, a part of the N$_2$O may be dissolved and absorbed in the liquefied N$_2$O$_4$, depending on the temperature condition and the pressure condition of the absorption step. N$_2$ and CO$_2$ in the source gas are even more difficult to be absorbed than N$_2$O, in the absorption solution.

During the operation of such absorption step (first absorption step), an additional absorption step (second absorption step) may be executed, to additionally apply the absorption solution to unabsorbed gas that has not been absorbed in the absorption solution through the first absorption step. To execute the second absorption step, the circulating pump 5$a$ is activated so as to circulate the absorption solution as described above, between the gas absorption vessel 1 and the absorption tower 3. Such step causes the unabsorbed gas (containing NO, NO$_2$, N$_2$O, N$_2$, CO$_2$ and so forth) remaining unabsorbed in the absorption solution through the first absorption step to make a gas-liquid contact with the circulating absorption solution, upon moving to the absorption tower 3 from the gas absorption vessel 1 and while ascending inside the absorption tower 3. Because of such gas-liquid contact, NO and NO$_2$ in the unabsorbed gas is reacted and absorbed with priority in the circulating absorption solution, as in the first absorption step (in other words, separated from other components in the unabsorbed gas). Executing thus two stages of absorption step (first and second absorption step) is appropriate for improving the net absorption amount or absorptivity of NO into the absorption solution, and hence appropriate for increasing the yield of NO.

The unabsorbed gas remaining unabsorbed in the absorption solution through the absorption step (including first absorption step and second absorption step) is led to the condenser 6, from the gas absorption vessel 1 through the absorption tower 3 and the transfer line 7$d$. Out of such unabsorbed gas, the purity of N$_2$O can be increased as in the third embodiment. The N$_2$O of the higher purity is discharged out of the apparatus through the outlet line 7$f$, and can be collected as purified gas. To adjust the concentration of NO and NO$_2$ before executing the condensation-separation step in the condenser 6 when increasing the purity of N$_2$O, NO and NO$_2$ are added through the inlet line 7$b$, to the gas flowing through the transfer line 7$d$.

After the absorption step (first absorption step and second absorption step), the revaporization step is executed in the gas absorption vessel 1 and the absorption tower 3. To be more detailed, the temperature control units 2, 4 are controlled, and the pressure regulating valves 8$a$, 8$b$ are controlled as the case may be, so as to heat and/or depressurize the absorption solution in the gas absorption vessel 1 and the absorption tower 3. Heating and/or depressurizing the absorption solution promotes evaporation of N$_2$O$_3$ in the absorption solution. A majority of the evaporated N$_2$O$_3$ is immediately decomposed into NO and NO$_2$, so that from such NO and NO$_2$ the intermediate gas, in which NO, NO$_2$, N$_2$O$_3$, and N$_2$O$_4$ are equilibrated according to the chemical formulae (1) and (2), is generated. The intermediate gas has achieved the equilibrium among NO, NO$_2$, N$_2$O$_3$, and N$_2$O$_4$ from an equivalent amount of NO and NO$_2$ according to the chemical formulae (1) and (2), and hence contains a larger amount of NO than NO$_2$.

At an initial stage of such revaporization step, an additional absorption step (third absorption step), may be executed, so as to apply the absorption solution again to the intermediate gas being generated. To execute the third absorption step, the circulating pump 5$a$ is activated to thereby circulate the absorption solution as above between the gas absorption vessel 1 and the absorption tower 3, as in the second absorption step. In this case, it is preferable to successively execute the third absorption step from the second absorption step. At the initial stage of the revaporization step, a minute amount of N$_2$O and a trace amount of N$_2$, CO$_2$ and so forth once absorbed in the absorption solution are evaporated with priority to NO and NO$_2$, and hence the intermediate gas at the initial stage contains a relatively large amount of N$_2$O, N$_2$, CO$_2$ and so forth (though NO and NO$_2$ are also contained). Upon executing the third absorption step, the intermediate gas of the initial stage makes a gas-liquid contact with the circulating absorption solution while ascending through the absorption tower 3, so that through the gas-liquid contact NO and NO$_2$ in the intermediate gas are reacted and absorbed in the circulating absorption solution with priority, as in the first absorption step. Accordingly, executing the third absorption step in parallel with the revaporization step enables efficiently separating N$_2$O, N$_2$, CO$_2$ and so forth in the intermediate gas from NO, utilizing the difference in absorptivity among the gas components with respect to the absorption solution. Also, in the case of adopting the third absorption step the third absorption step is terminated halfway of the revaporization step, and through the revaporization step not accompanied with the third absorption step N$_2$O, N$_2$, CO$_2$ and so forth are sufficiently removed, so that the intermediate gas containing NO and NO$_2$ can be generated from the absorption solution, with NO being condensed in the absorption, solution.

The intermediate gas flowing out of the absorption tower 3 during the revaporization step reaches the condenser 6 through the transfer line 7$d$, and is subjected to the condensation-separation step in the condenser 6. Also, the intermediate gas reaches the condenser 6 together with NO$_2$ supplied as the case may be through the inlet line 7$b$ provided between the pressure regulating valve 8$a$ and the condenser 6, and is subjected to the condensation-separation step in the condenser 6. More specifically, in the condenser 6 the intermediate gas is cooled and/or pressurized so as to achieve a condition that allows $N_2O_3$ and $N_2O_4$ in the intermediate gas to be liquefied and removed from the gas phase. Once the $N_2O_3$ and the $N_2O_4$ are liquefied and removed from the gas phase, $N_2O_3$ and $N_2O_4$ are quickly generated from NO and $NO_2$ remaining in the gas phase so as to restore the equilibrium according to the chemical formulae (1) and (2), and the $N_2O_3$ and the $N_2O_4$ newly generated are immediately liquefied, thus to be removed from the gas phase. Accordingly, the purity of NO in the intermediate gas can be highly increased by continuing the condensation-separation step until $NO_2$ in the intermediate gas is sufficiently removed. NO of the higher purity is discharged out of the apparatus through the outlet line 7f, and can be collected as purified gas. Also, the liquefied $N_2O_3$ and the liquefied $N_2O_4$ are returned to the upper portion of the absorption tower 3 through the transfer line 7e, upon activating the circulating pump 5b. The internal temperature in the condenser 6 during the execution of the condensation-separation step is $-9°$ C. or lower for example, preferably in a range of $-102$ to $-50°$ C., and the internal pressure is 0.01 to 6 MPa, for example.

After the condensation-separation step, upon heating and/or depressurizing the absorption solution in the gas absorption vessel 1 and the absorption tower 3 by controlling the temperature control units 2, 4, as well as the pressure regulating valves 8a, 8b as the case may be, thereby promoting the evaporation of $N_2O_4$, $N_2O_4$ gives $NO_2$ of high purity. The $NO_2$ thus produced is discharged out of the apparatus through the transfer line 7d, the condenser 6, and the outlet line 7f, and can be collected as purified gas.

As described above, employing the purification apparatus Y according to the fourth embodiment allows sequentially purifying $N_2O$, NO, and $NO_2$ out of the source gas efficiently, despite that the source gas is a multicomponent gas containing NO, $NO_2$, $N_2O_3$, $N_2O_4$, $N_2O$, $N_2$, and $CO_2$. Besides, the method according to this embodiment eliminates the need to condense or liquefy. NO and $NO_2$ in the purifying step, thereby enabling purifying $NO_2$ with high safety.

Figure 3:
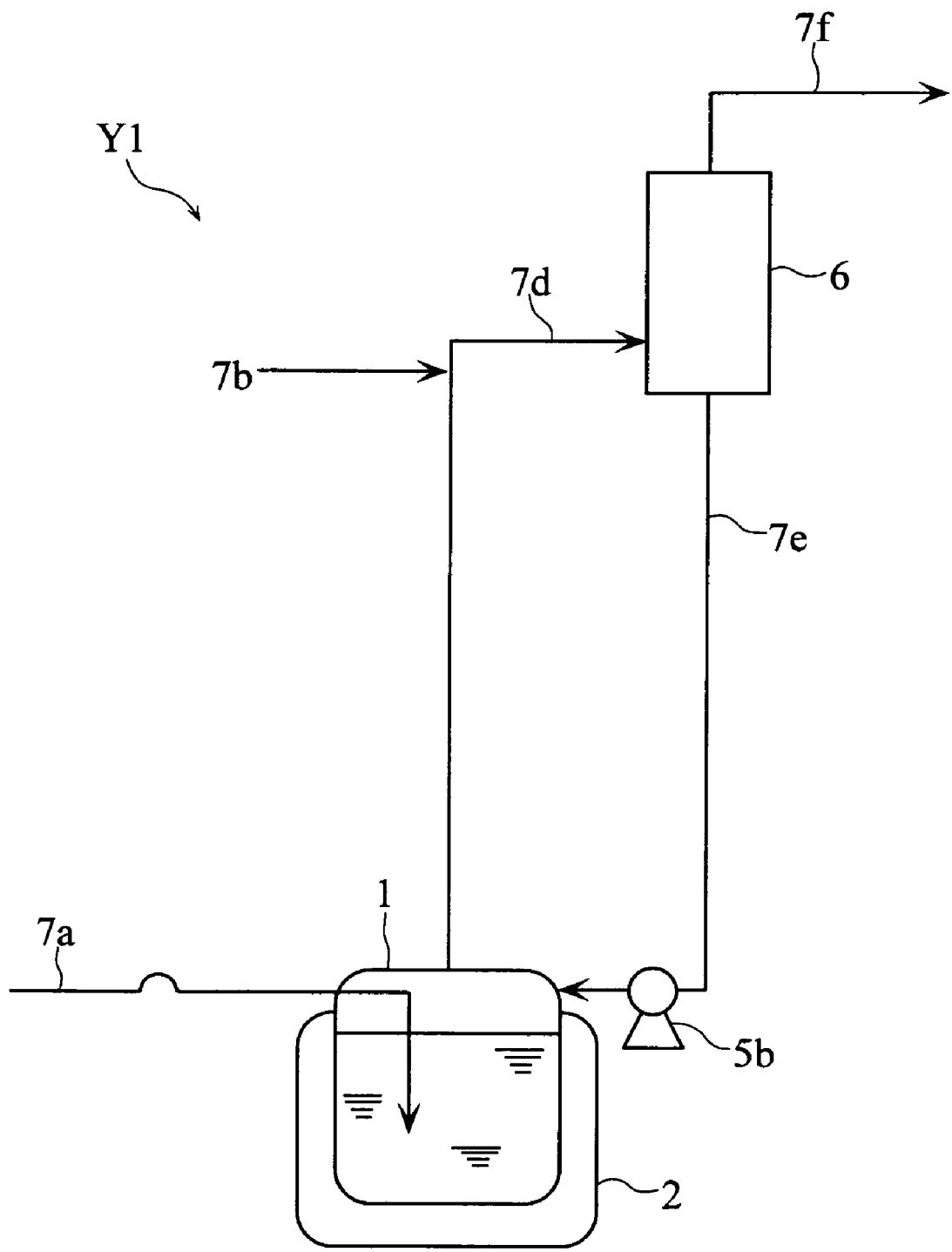
FIG. 3 is a schematic diagram showing another purification apparatus employed for executing the nitrogen oxide purification method according to the present invention.

FIG. 3 is a schematic diagram showing another purification apparatus Y1, which is a simplified variation of the purification apparatus Y shown in FIG. 2. The purification apparatus Y1 shown in FIG. 3 is made up by excluding the absorption tower 3, the temperature control unit 4, the circulating pump 5a, the circulation line 7c, and the pressure regulating valves 8a, 8b from the purification apparatus Y shown in FIG. 2, so as to return the condensed solution from the condenser 6 directly to the absorption vessel 1, through the circulating pump 5b and the transfer line 7e. Accordingly, the absorption of the predetermined component from the source gas is solely performed in the absorption vessel 1, and the adjustment of the equilibrating reaction according to the chemical formulae (1) to (3) is executed only through the temperature adjustment, and the composition adjustment executed through the inlet line 7b.

EXAMPLES

Examples of the present invention will be described below.

Example 1

As the example 1, the NO purification method was executed with the condenser X shown in FIG. 1. In this example, a glass trap (500 cm$^3$) cooled to $-80°$ C. was employed as the condenser X, and raw NO gas containing 5000 ppm of $NO_2$ as the source gas, and such source gas was supplied through the condenser X at a rate of 100 cm$^3$/minute (condensation-separation step). As a result, $N_2O_3$ and $N_2O_4$ generated from NO and $NO_2$ in the source gas were condensed in the condenser X, and $NO_2$ concentration in the purified NO gas led out of the condenser X was 80 ppm.

Example 2

As the example 2, the $N_2O$ purification method was executed with the condenser X shown in FIG. 1. In this example, a glass trap (500 cm$^3$) cooled to $-80°$ C. was employed as the condenser X, and raw $N_2O$ gas containing 2000 ppm of NO as the source gas. In this example, firstly $NO_2$ was added to the source gas to achieve a final concentration of 2000 ppm (concentration adjustment step). Then the source gas subjected to such concentration adjustment was supplied through the condenser X at a rate of 100 cm$^3$/minute (condensation-separation step). As a result, $N_2O_3$ and $N_2O_4$ generated from NO and $NO_2$ in the source gas were condensed in the condenser X, and NO concentration in the purified $N_2O$ gas led out of the condenser X was 50 ppm, and $NO_2$ concentration was 30 ppm.

Example 3

As the example 3, the NO purification method was executed with the condenser Y1 shown in FIG. 3. In this example, a container (500 cm$^3$) cooled to $-10°$ C. was employed as the gas absorption vessel 1, a glass trap (500 cm$^3$) cooled to $-70°$ C. as the condenser 6, liquefied $N_2O_4$ (90 g) as the absorption solution, and raw NO gas containing 1000 ppm of $N_2$ and 1000 ppm of $N_2O$ as the source gas.

In this example, the absorption step and the revaporization step in the gas absorption vessel 1, as well as the condensation-separation step in the condenser 6 were executed. In the absorption step, the liquefied $N_2O_4$ (90 g, $-10°$ C.) was caused to absorb 32 g of source gas under normal pressure. In the revaporization step, the internal temperature in the gas absorption vessel 1 was gradually raised from $-10°$ C. to $2°$ C. In the condensation-separation step, the gas evaporated in the revaporization step was supplied through the condenser 6, to produce condensed $N_2O_3$ and $N_2O_4$ gas generated from NO and $NO_2$ in the condenser 6. Upon investigating the fluctuation in composition ratio with time of the purified NO gas led out of the condenser 6, although $N_2$ was detected from the first 2 g of gas from the start of discharge, no $N_2$ was detected from the subsequently led out 27 g of gas. On the other hand, the $N_2O$ concentration in the gas being led out gradually decreased with time, and the $N_2O$ concentration in the gas collected at the end of the discharge was 80 ppm.

Example 4

As the example 4, the $N_2O$ and NO purification method was executed with the condenser Y shown in FIG. 2. In this example, the first to the third absorption step and the revaporization step in the gas absorption vessel 1 and the absorption tower 3 were executed, and the condensation-separation step in the condenser 6 was also executed.

A container of 3 dm$^3$ was employed as the gas absorption vessel 1, on top of which a column (diameter 5 cm, length 20 cm) loaded with glass beads of 3 mm in diameter was attached as the absorption tower 3. Also, the pressure regulating valve 8b was excluded, and a glass trap (500 cm$^3$) was employed as the condenser 6.

After cooling the internal temperature of the gas absorption vessel 1 to $-5°$ C., $NO_2$ was introduced into the gas absorption vessel 1, and 700 g of liquefied $N_2O_4$ was loaded in the gas absorption vessel 1. Then a source gas containing $N_2O$ (400 g), NO (300 g), and $NO_2$ (460 g) was introduced over a period of two hours, while maintaining the internal temperature of the gas absorption vessel 1 at −5° C. (first absorption step). During this period, the circulating pump 5a was activated, so as to supply the absorption solution in the gas absorption vessel 1 to an upper portion of the absorption tower 3 at a rate of 60 cm$^3$/minute (second absorption step). The outlet gas pressure from the absorption tower 3 during the execution of the second absorption step was adjusted at 1 MPa with the pressure regulating valve 8a. $NO_2$ was added to the gas discharged from the pressure regulating valve 8a (containing $N_2O$ as predominant component, and NO of a lower composition ratio than $N_2O$) through the inlet line 7b at a rate of 20 g/hour, and the mixture was introduced into the condenser 6 cooled to −80° C. In this case, the purity of the purified $N_2O$ gas led out from the condenser 6 was not lower than 99.99%, and the collected amount was 378 g, which corresponds to a collection rate was 95%.

Then the addition of $NO_2$ through the inlet line 7b was stopped, and the internal temperature of the gas absorption vessel 1 and the absorption tower 3 was gradually increased to 30° C., with the circulating pump 5a kept working and the pressure in the system maintained at 1 MPa, to thereby generate an intermediate gas containing a relatively large amount of $N_2O$ (revaporization step and third absorption step). NO and $NO_2$ contained in the intermediate gas was reacted and absorbed with priority in the circulating absorption solution in the absorption tower 3, and $N_2O$ in the system was efficiently extracted.

Then after stopping the circulating pump 5a and further decreasing the internal temperature in the condenser 6 to −90° C., the set value of the pressure regulating valve 8a was successively varied from 1 MPa to 0.7 MPa so as to generate an intermediate gas while promoting the evaporation of $N_2O_3$ in the absorption solution in the gas absorption vessel 1 and the absorption tower 3 (revaporization step). Since a majority of the evaporated $N_2O_3$ is immediately decomposed into NO and $NO_2$, and the equilibrated state among NO, $NO_2$, $N_2O_3$, and $N_2O_4$ is restored from an equivalent amount of NO and $NO_2$ according to the chemical formulae (1), (2), the intermediate gas contains a larger amount of NO than $NO_2$. Such intermediate gas was introduced into the condenser 6 so as to condense $NO_2$, $N_2O_3$, and $N_2O_4$ (condensation-separation step), and the gas led out through the outlet line 7f was collected as purified NO gas. In this case, the gas containing NO as predominant component, sequentially led out from the pressure regulating valve 8a contained approximately 1% of $NO_2$ during an initial stage of the collection, and approximately 4% of $NO_2$ at the end of the collection. The purity of the collected purified NO gas was not lower than 99.99%, and the collected amount was 280 g, which corresponds to a collection rate of 93%.

The invention claimed is:

1. A method of purifying nitrogen oxides, comprising:
an initial absorption step for applying a first absorption solution containing liquefied dinitrogen tetraoxide to a source gas containing nitrogen monoxide, to cause the first absorption solution to absorb nitrogen monoxide;
an additional absorption step performed in parallel with the initial absorption step, the additional absorption step including applying a second absorption solution containing liquefied dinitrogen tetraoxide to an unabsorbed gas remaining unabsorbed in the first absorption solution through the initial absorption step, to cause the second absorption solution to absorb nitrogen monoxide in the unabsorbed gas;
a revaporization step for heating and/or depressurizing the first and second absorption solutions after the additional absorption step, to generate an intermediate gas from the first and second absorption solutions, the intermediate gas containing a larger amount of nitrogen monoxide and a smaller amount of nitrogen dioxide; and
a condensation-separation step for cooling and/or pressurizing the intermediate gas to convert nitrogen monoxide and nitrogen dioxide into condensed dinitrogen trioxide and/or condensed dinitrogen tetraoxide, the conversion of nitrogen monoxide including a reaction of nitrogen monoxide with nitrogen dioxide for conversion into the condensed dinitrogen trioxide, a non-condensed portion of the intermediate gas being separated from the condensed dinitrogen trioxide and/or the condensed dinitrogen tetraoxide for recovery.

2. A method of purifying nitrogen oxides, comprising:
an initial absorption step for applying a first absorption solution containing liquefied dinitrogen tetraoxide to a source gas containing nitrogen monoxide, to cause the absorption solution to absorb nitrogen monoxide;
a revaporization step for heating and/or depressurizing the first absorption solution after the initial absorption step, to generate an intermediate gas from the first absorption solution, the intermediate gas containing a larger amount of nitrogen monoxide and a smaller amount of nitrogen dioxide;
an additional absorption step performed in parallel with the revaporization step, the additional absorption step including applying a second absorption solution containing liquefied dinitrogen tetraoxide to an intermediate gas generated through the revaporization step, to cause the absorption solution to absorb nitrogen monoxide and nitrogen dioxide in the intermediate gas; and
a condensation-separation step for cooling and/or pressurizing the intermediate gas to convert nitrogen monoxide and nitrogen dioxide into condensed dinitrogen trioxide and/or condensed dinitrogen tetraoxide, the conversion of nitrogen monoxide including a reaction of nitrogen monoxide with nitrogen dioxide for conversion into the condensed dinitrogen trioxide, a non-condensed portion of the intermediate gas being separated from the condensed dinitrogen trioxide and/or the condensed dinitrogen tetraoxide for recovery.

3. A method of purifying nitrogen oxides, comprising:
an initial absorption step for applying an absorption solution containing liquefied dinitrogen tetraoxide to a source gas containing nitrogen monoxide, to cause the absorption solution to absorb nitrogen monoxide;
a revaporization step for heating and/or depressurizing the absorption solutions after the initial absorption step, to generate an intermediate gas from the absorption solution, the intermediate gas containing a larger amount of nitrogen monoxide and a smaller amount of nitrogen dioxide; and
a condensation-separation step for cooling and/or pressurizing the intermediate gas to convert nitrogen monoxide and nitrogen dioxide into condensed dinitrogen trioxide and/or condensed dinitrogen tetraoxide, the conversion of nitrogen monoxide including a reaction of nitrogen monoxide with nitrogen dioxide for conversion into the condensed dinitrogen trioxide, a non-condensed portion of the intermediate gas being separated from the condensed dinitrogen trioxide and/or the condensed dinitrogen tetraoxide for recovery,
wherein the source gas further contains nitrous oxide.

4. The method according to claim 3, wherein an unabsorbed gas remaining unabsorbed in the absorption solution through the absorption step contains at least nitrous oxide and impurity nitrogen monoxide, the method further comprising:

a composition adjustment step for adding nitrogen dioxide to the unabsorbed gas; and a preliminary condensation-separation step for cooling and/or pressurizing the unabsorbed gas that has undergone the composition adjustment step to produce condensed dinitrogen trioxide and/or condensed dinitrogen tetraoxide.

* * * * *